(12) United States Patent
Kim (10) Patent No.: US 7,106,553 B2
(45) Date of Patent: Sep. 12, 2006

(54) HARD DISK DRIVE HAVING A DISK FLUTTERING REDUCING UNIT THAT USES AN AIR DAMPING EFFECT TO REDUCE THE FLUTTERING OF A ROTATION DISK

(75) Inventor: Do-wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/394,067

(22) Filed: Mar. 24, 2003

(65) Prior Publication Data

US 2003/0179493 A1    Sep. 25, 2003

(30) Foreign Application Priority Data

Mar. 25, 2002 (KR) .............................. 2002-16085

(51) Int. Cl.
*G11B 33/14* (2006.01)
(52) U.S. Cl. ................................. 360/97.02; 360/97.03
(58) Field of Classification Search ............ 360/97.01, 360/97.02, 97.03, 97.04
See application file for complete search history.

(56) References Cited

U.S. PATENT DOCUMENTS

| 6,088,190 | A  | * | 7/2000  | Anderson ................. 360/97.02 |
| 6,236,532 | B1 | * | 5/2001  | Yanagisawa ............. 360/97.02 |
| 6,466,398 | B1 | * | 10/2002 | Butler et al. ............. 360/97.02 |
| 6,493,310 | B1 | * | 12/2002 | Kim et al. .................. 720/611 |
| 6,624,966 | B1 | * | 9/2003  | Ou-Yang et al. ......... 360/97.02 |
| 2002/0154441 | A1 | * | 10/2002 | Tadepalli et al. ......... 360/97.02 |

FOREIGN PATENT DOCUMENTS

| JP | 2000-331460 | 11/2000 |
| JP | 2000331460 A | * 11/2000 |
| JP | 2001-23347 | 1/2001 |
| WO | WO 99/52108 | 10/1999 |
| WO | WO 01/97221 A2 | 12/2001 |
| WO | WO 02/09097 A2 | 1/2002 |

OTHER PUBLICATIONS

R. Seishin, Noise Damping Device for Rotating Apparatus, 2000-065133 Patent Abstracts of Japan, Mar. 3, 2000, 1 page.

* cited by examiner

*Primary Examiner*—William J Klimowicz
(74) *Attorney, Agent, or Firm*—Staas & Halsey LLP

(57) ABSTRACT

A hard disk drive having a disk fluttering reducing unit includes a lower air damper forming member provided on an upper surface of a base plate to face a bottom surface of an outer circumferential side of the disk, and an upper air damper forming member provided on a bottom surface of a cover plate to face an upper surface of an outer circumferential side of the disk. At least one air compression surface is inclined in a circumferential direction of the disk so that a gap formed between the disk and the corresponding air damper forming members decreases along a rotational direction of the disk and is formed at each of surfaces of the air damper forming members facing the disk. The air compression surface is inclined in a radial direction of the disk so that the gap decreases from an inner circumferential side of the disk to an outer circumferential side of the disk. When at least two disks are provided, a middle air damper forming member disposed between the two disks is provided. Thus, disk fluttering is reduced by an air damping operation of the disk fluttering reducing unit so that a reliability of data recording and reproducing is improved.

37 Claims, 7 Drawing Sheets

HARD DISK DRIVE HAVING A DISK
FLUTTERING REDUCING UNIT THAT USES
AN AIR DAMPING EFFECT TO REDUCE
THE FLUTTERING OF A ROTATION DISK

CROSS-REFERENCE TO RELATED
APPLICATIONS

This application claims the benefit of Korean Patent Application No. 2002-16085, filed Mar. 25, 2002, in the Korean Intellectual Property Office, the disclosure of which is incorporated herein by reference.

BACKGROUND OF THE INVENTION

1. Field of the Invention

The present invention relates to a hard disk drive, and more particularly, to hard disk drive having a disk fluttering reducing unit which reduces fluttering of a rotating disk.

2. Description of the Related Art

A hard disk drive (HDD) is one of auxiliary memory devices of a computer, which reads out data stored in a magnetic disk or records data on the magnetic disk by using a magnetic head. Recently, a variety of research and development efforts are being performed to realize the hard disk drive having a high speed, a high capacity, low fluttering, and a low noise.

Figure 1:
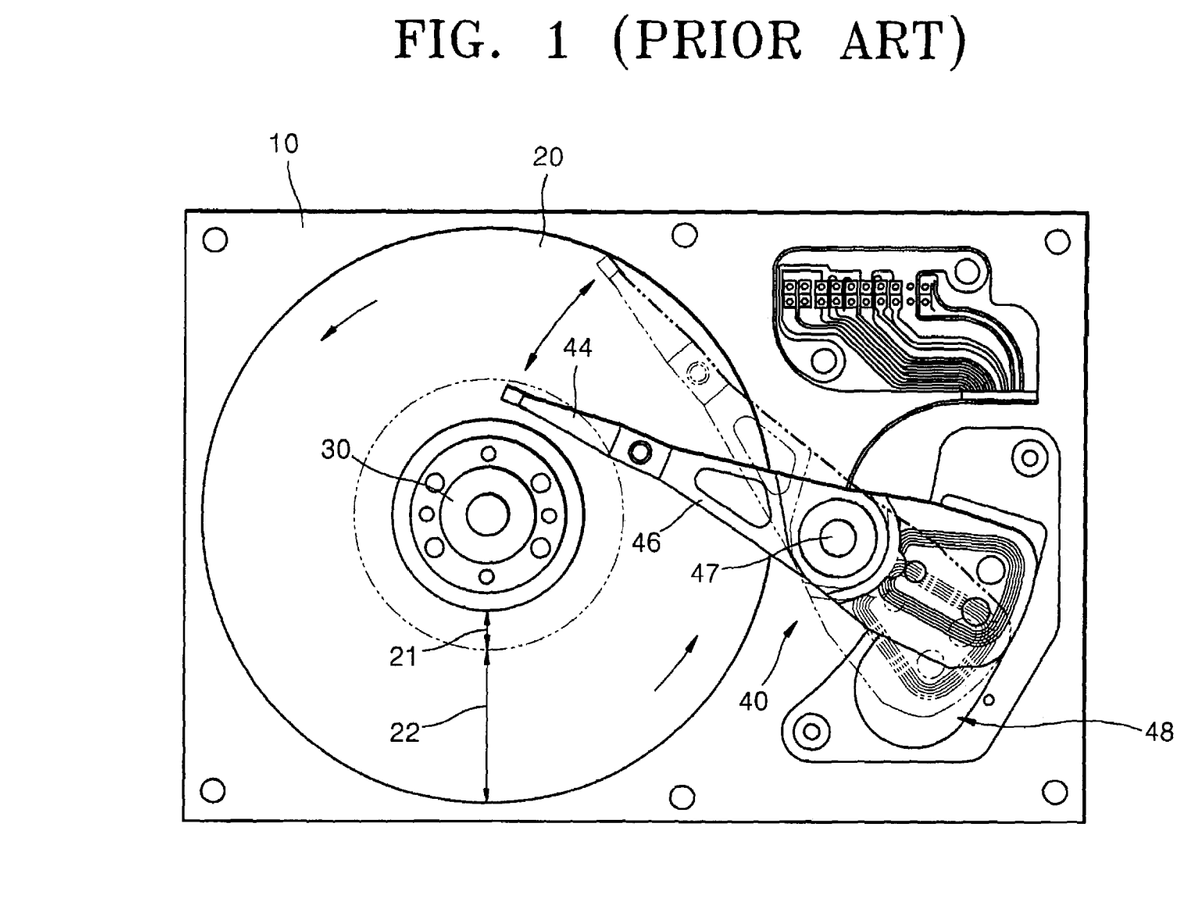
FIG. 1 is a plan view showing a conventional hard disk drive.
Figure 2:
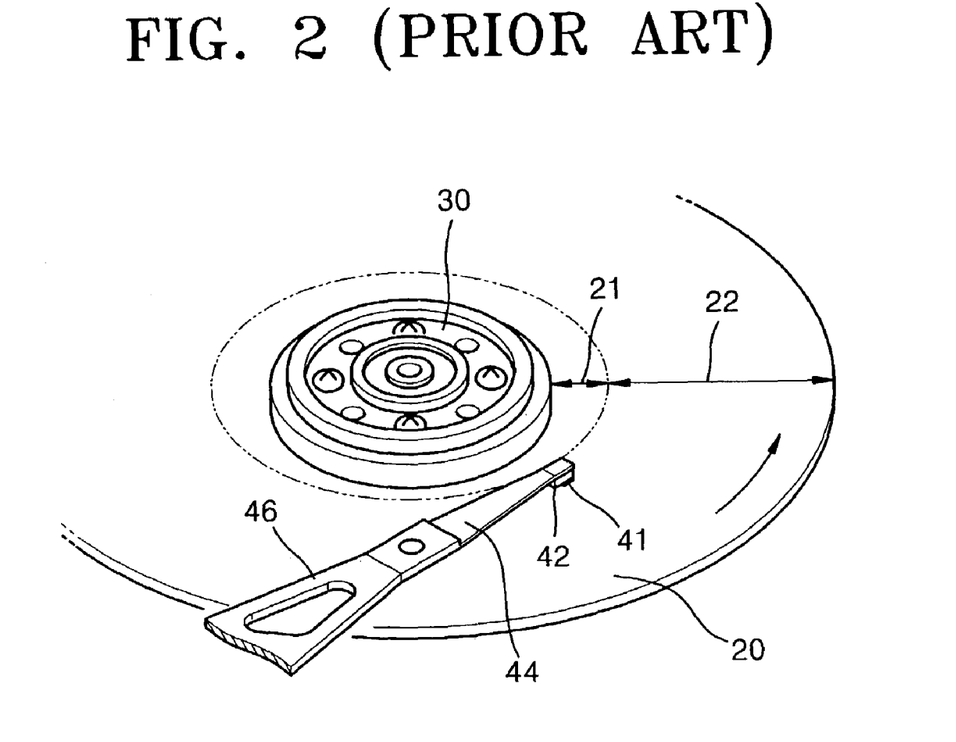
FIG. 2 is an enlarged perspective view showing a portion of the hard disk drive of FIG. 1.

FIG. 1 is a plan view showing a conventional hard disk drive, and FIG. 2 is an enlarged perspective view of a portion of the hard disk drive of FIG. 1.

Referring to FIGS. 1 and 2, the hard disk drive includes a magnetic disk (a hard disk) 20 which is a recording medium storing of data, a spindle motor 30 installed on a base 10 to rotate the disk 20, and an actuator 40 having a magnetic head 41 to reproduce the data recorded in the disk 20.

As the disk 20, a single disk or a plurality of disks are installed to be rotated by the spindle motor 30 and separated by a predetermined distance from each other. A parking zone 21 where a slider 42 is located when power of the hard disk drive is off is provided at an inner circumferential side of the disk 20, and a data zone 22 where a magnetic signal is recorded is provided outside the parking zone 21. A servo signal indicating a position of information to be recorded is recorded on several tens of thousands of tracks formed along a circumference of the disk 20.

The actuator 40 is installed to be capable of pivoting by a voice coil motor 48 around a pivot shaft 47 installed on the base 10. The actuator 40 includes an arm 46 coupled to the pivot shaft 47 to be capable of pivoting, and a suspension 44 which supports a slider 42 installed at the arm 46 to be elastically biased toward a surface of the disk 20. The magnetic head 41 is mounted on the slider 42.

Figure 3:
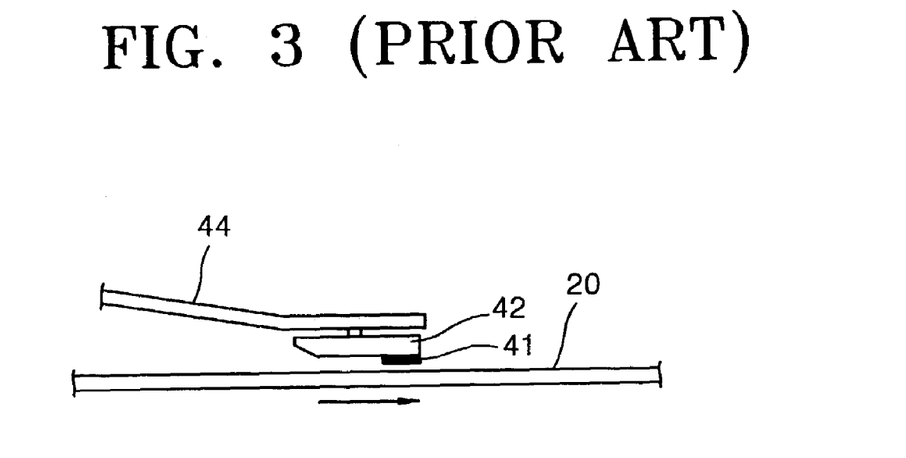
FIG. 3 is a side view showing a portion of a slider of the hard disk drive shown in FIG. 2.

When the power of the hard disk drive is off, the slider 42 is disposed in the parking zone 21 of the disk 20 by an elastic force of the suspension 44. When the power is turned on, and the disk 20 starts to rotate, a lift force is generated by air pressure, and accordingly the slider 42 is lifted. The slider 42 being lifted is moved to the data zone 22 of the disk 20 as the actuator 40 pivots. The slider 42 moved to the data zone 22 of the disk 20 maintains a lifted state at a height where the lift force by a rotation of the disk 20 and the elastic force by the suspension 44 are balanced, as shown in FIG. 3. Thus, the magnetic head 41 mounted on the slider 42 records and reproduces data on and from the disk 20 as it maintains a predetermined distance from the disk 20 that is rotating.

However, in the conventional hard disk drive having the above structure, fluttering of the disk 20 is caused by defective parts of the spindle motor 30, eccentricity in an assembly of the disk 20, or an irregular air flow occurring during the rotation of the disk 20 in the hard disk drive. As the fluttering, there is RRO (repeatable runout) that is a component repeated at each of rotations and NRRO (non-repeatable runout) that is a component which is not repeated. The RRO which regularly repeats can be compensated by a servo control system to a certain degree whereas the NRRO is difficult to be anticipated and compensated. The disk fluttering reduces a data recording and reproduction capability of the magnetic head 41 and finally exerts a bad influence on a performance of the hard disk drive.

Conventionally, when the disk fluttering is generated at the disk 20, an interval between the slider 42 and the disk 20 can be maintained to a certain degree by a damping effect by air existing therebetween. However, as a rotation speed of the disk 20 increases, and a thickness of the disk 20 decreases, the disk fluttering is amplified so that accurate recording or reproduction of data is made difficult by only a servo control system and an air damping effect between the slider 42 and the disk 20. Further, as TPI (track per inch) increases recently, the disk fluttering makes an accurate control of a position of the magnetic head 41 difficult.

In light of the above, it is necessary to reduce the disk fluttering occurring during an operation to secure reliability in the performance of the hard disk drive. Furthermore, as the hard disk drive recently exhibits a high speed, a high capacity, and a low noise, it is important to reduce disk fluttering.

SUMMARY OF THE INVENTION

To solve the above-described problems, it is an aspect of the present invention to provide a hard disk drive having a disk fluttering reducing unit so that fluttering of a rotating disk is reduced by using an air damping effect.

Additional aspects and advantages of the invention will be set forth in part in the description which follows and, in part, will be obvious from the description, or may be learned by practice of the invention.

To achieve the above and/or other aspects, a hard disk drive includes a housing having a base plate and a cover plate, a spindle motor installed on the base plate, a disk installed at the spindle motor to store data, an actuator installed on the base plate to be capable of pivoting and having a magnetic head to record and reproduce data on and from the disk, and a disk fluttering reducing unit forming an air damper above a surface of the disk to reduce fluttering of the disk, wherein the disk fluttering reducing unit comprises a lower air damper forming member provided on an upper surface of the base plate to face a bottom surface of an outer circumferential side of the disk, and an upper air damper forming member provided on a bottom surface of the cover plate to face an upper surface of an outer circumferential side of the disk, and at least one air compression surface formed on the lower and/or upper air damper forming members and inclined with respect to a circumferential direction of the disk so that a gap formed between the air compression surface and the disk decreases along a rotational direction of the disk.

It is possible that the lower air damper forming member is integrally formed with the base plate, and the upper air damper forming member is integrally formed with the cover plate.

It is possible that the air compression surface is inclined in a radial direction of the disk so that a gap with the disk decreases from an inner circumferential of the disk side to an outer circumferential side of the disk.

It is possible that the disk fluttering reducing unit is provided close to and in front of the actuator.

It is possible that disk fluttering reducing units are provided at corresponding ones of two positions opposite to each other with respect to the spindle motor.

It is possible that each of the air damper forming members of the disk fluttering reducing unit has a C shape in which a portion is open not to interfere with the actuator, to face an overall surface at an outer circumferential side of the disk except for a range of an operation of the actuator.

It is possible that a plurality of air compression surfaces are sequentially formed from one end portion of each of the air damper forming members to the other end portion thereof along the circumferential direction of the disk.

In a hard disk drive in which at least two disks are provided according to another aspect of the present invention, a disk fluttering reducing unit includes a middle air damper forming member disposed between the disks in addition to a lower air damper forming member and an upper air damper forming member which are disposed to face corresponding ones of the disks, respectively.

It is possible that the lower and upper air damper forming members are integrally formed with the base plate and the cover plate, respectively, and the middle air damper forming member is installed on the base plate to be capable of pivoting with respect to the base plate.

Thus, fluttering of the disk is reduced by an air damping operation of the disk fluttering reducing unit so that reliability of data recording and/or reproducing on/from the disk is improved.

BRIEF DESCRIPTION OF THE DRAWINGS

These and/or other aspects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, hard disk drives having a disk fluttering reducing unit according to embodiments of the present invention will be described in detail with reference to the accompanying drawings.

Figure 4:
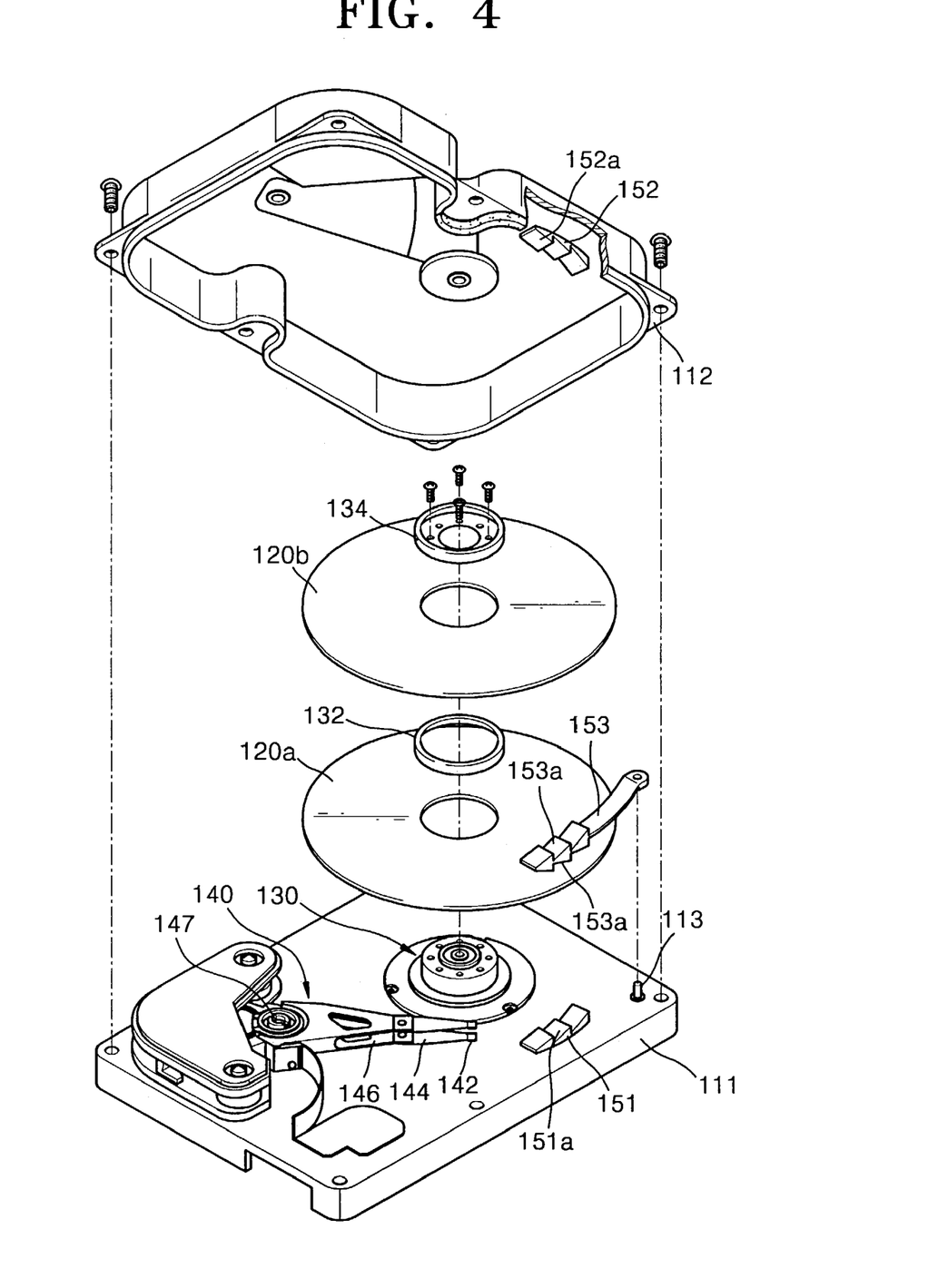
FIG. 4 is an exploded perspective view showing a hard disk drive having a disk fluttering reducing unit according to an embodiment of the present invention.
Figure 5:
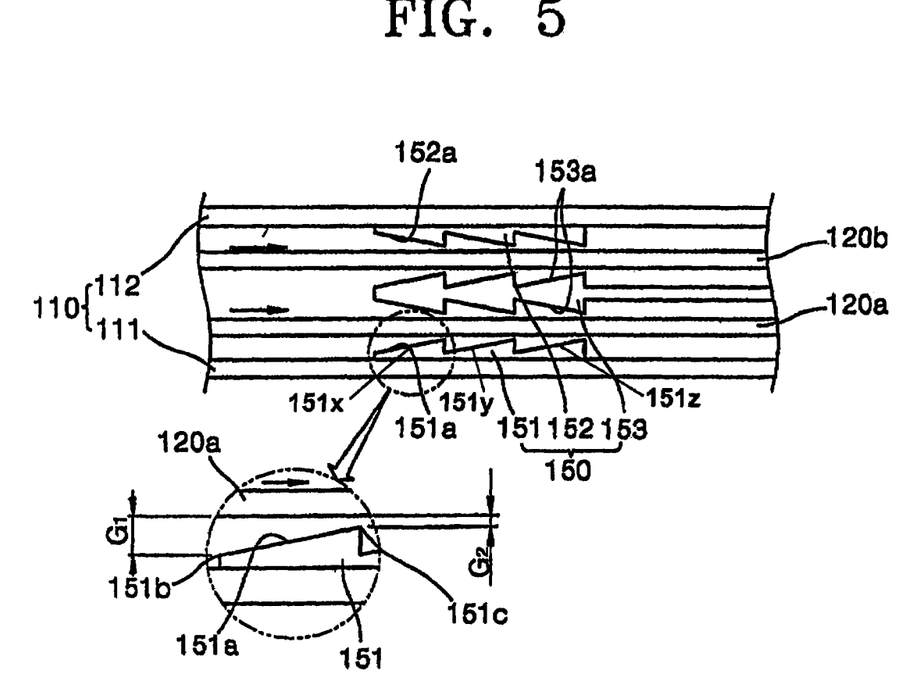
FIG. 5 is an enlarged side view showing a portion of the disk fluttering reducing unit shown in FIG. 4.

Referring to FIGS. 4 and 5, a hard disk drive according to an embodiment of the present invention includes a housing 110 having a predetermined inner space. A spindle motor 130, magnetic disks 120a and 120b, an actuator 140, and a disk fluttering reduction unit 150 are installed in the housing 110.

The housing 110 is formed with a base plate 111 supporting the spindle motor 130 and the actuator 140 and a cover plate 112 coupled to the base plate 111 and enclosing and protecting the disks 120a and 120b, and is installed inside a main body of a computer. The housing 110 is typically formed of a stainless or aluminum material.

A single or a plurality of the disks 120a and 120b are installed in the housing 110. Conventionally, four or more disks are installed in the hard disk drive to increase a data storing capacity. Recently, as a recording density of a disk surface increases, only one or two disks can store a sufficient amount of data. Thus, the hard disk drive having one or two disks is a main stream in recent days. Accordingly, the hard disk drive having the two disks 120a and 120b will be used in a description of the present invention as an example. However, the present invention is not limited to the hard disk drive having two disks. Accordingly, the present invention can be applied to a hard disk drive having a single disk or two or more disks.

The spindle motor 130 is fixedly installed on the base plate 111 to rotate the disks 120a and 120b. When the two disks 120a and 120b are installed at the spindle motor 130, a ring type spacer 132 maintains an interval between the two disks 120a and 120b and is inserted therebetween. A clamp 134 preventing an escape of the disks 120a and 120b from a shaft of the spindle motor 130 is coupled to an upper end portion of the spindle motor 130.

The actuator 140 is installed on the base plate 111 to be capable of pivoting to record or produce data on or from the disks 120a and 120b. The actuator 140 includes an arm 146 coupled to a pivot shaft 147 to be capable of pivoting and a suspension 144 installed at the arm 146 to support a slider 142 where a magnetic head is mounted to be elastically biased toward a surface of the disks 120a and 120b.

The disk fluttering reducing unit 150 reducing disk fluttering when the disks 120a and 120b rotate, is provided in the hard disk drive. The disk fluttering reducing unit 150 includes a lower air damper forming member 151 disposed under the first disk 120a and an upper air damper forming member 152 disposed above the second disk 120b. When the two disks 120a and 120b are installed, as shown in FIG. 4, the disk fluttering reducing unit 150 may further include a middle air damper forming member 153 disposed between the two disks 120a and 120b.

The air damper forming members 151, 152, and 153 are installed close to and in front of the actuator 140. Since the slider 142 installed at an end portion of the actuator 140 and having the magnetic head mounted thereon, and the air damper forming members 151, 152, and 153 are disposed closer to each other, a disk fluttering reduction effect by the slider 142 and the air damper forming members 151, 152 and 153 is improved during a rotation of the magnetic head more definitely.

The air damper forming members 151, 152, and 153 are installed to face corresponding outer circumferential surfaces of the disks 120a and 120b. Also, the air damper forming members 151, 152, and 153 are installed at corresponding positions with the disks 120a and 120b. In detail, the lower air damper forming member 151 is installed on an upper surface of the base plate 111 to face a bottom surface of the first disk 120a. The upper air damper forming member 152 is installed on a bottom surface of the cover plate 112 to face an upper surface of the second disk 120b. Preferably, the lower air damper forming member 151 and the upper air damper forming member 152 are integrally formed with the base plate 111 and the cover plate 112, respectively. Since the lower air damper forming member 151 and the upper air damper forming member 152 can be simultaneously formed when the base plate 111 and the cover plate 152 are manufactured, a manufacturing process can be simplified and a manufacturing cost can be lowered. Alternatively, it is possible to fixedly install the lower air damper forming member 151 and the upper air damper forming member 152 at the base plate 111 and the cover plate 112, respectively, after the lower air damper forming member 151 and the upper air damper forming member 152 are manufactured as separate members.

The middle air damper forming member 153 is installed such that one end portion thereof is coupled to a pivot pin 113 installed to protrude at a corner of the base plate 111 to be capable of pivoting and the other end portion thereof is installed to be interposed between the two disks 120a and 120b. The middle air damper forming member 153 is installed to be capable of pivoting to avoid an interference with the disks 120a and 120b and the middle air damper forming member 153 when the disks 120a and 120b are coupled to the spindle motor 130 since the middle air damper forming member 153 is disposed between the two disks 120a and 120b unlike the lower and upper air damper forming members 151 and 152.

Figure 6:
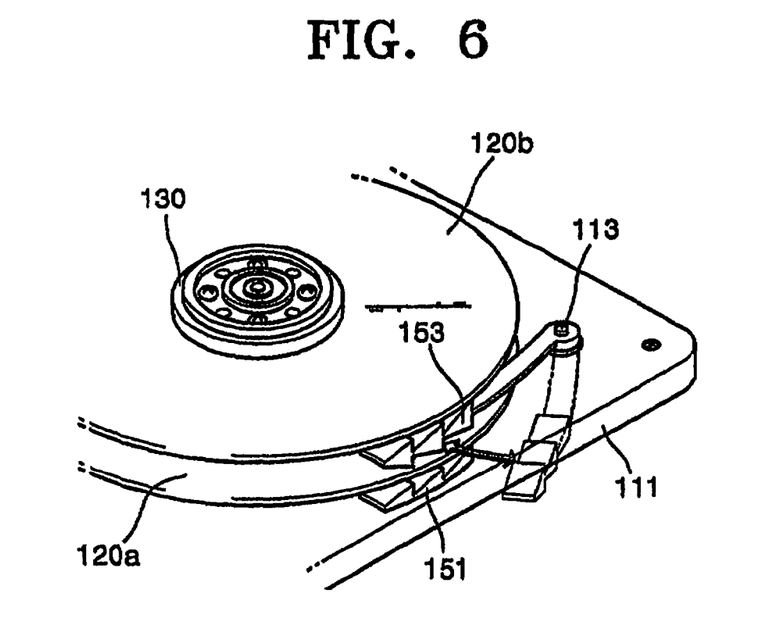
FIG. 6 is an enlarged perspective view explaining an operation of a middle air damper forming member of the disk fluttering reducing unit shown in FIG. 4.

FIG. 6 is a view explaining an operation of the middle air damper forming member shown in FIG. 4. Referring to FIG. 6, before the first disk 120a is assembled to the spindle motor 130, the middle air damper forming member 153 pivots around the pivot pin 113 so that the other end portion thereof is located outside the base plate 111 or the first disk 120a, as indicated by a dot-dash line in FIG. 6. Next, after the first disk 120a is assembled to the spindle motor 130, the middle air damper forming member 153 is rotated in a direction indicated by an arrow so that the other end portion thereof is located above the first disk 120a. Next, the second disk 120b is assembled to the spindle motor 130. Accordingly, the two disks 120a and 120b can be assembled to the spindle motor 130 without the interference with the middle air damper forming member 153. In the meantime, the middle air damper forming member 153 can be rotated in the direction indicated by the arrow so that the other end portion thereof can be inserted between the two disks 120a and 120b after the two disks 120a and 120b are assembled to the spindle motor 130.

Referring back to FIGS. 4 and 5, at least one air compression surface 151a, 152a, or 153a is formed on each of surfaces of the air damper forming members 151, 152, and 153 facing the corresponding disks 120a and 120b. The air compression surfaces 151a, 152a, and 153a are inclined along a rotational direction of the disks 120a and 120b such that a gap formed between the air compression surface 151a, 152a, and 153a and the disks 120a and 120b decreases. That is, since the air compression surface 151a, 152a, and 153a are inclined with respect to a circumferential direction of the disks 120a and 120b, a gap varies between the air compression surface 151a, 152a, and 153a and the corresponding disks 120a and 120b. A first gap $G_1$ of an air inlet end 151b where air is input, is greater than a second gap $G_2$ of an air outlet end 151c where air is exhausted. For example, the first gap $G_1$ at the air inlet end 151b is about 1–1.5 mm while the second gap $G_2$ at the air outlet end 151c is about 0.1–0.6 mm.

The air damper forming members 151, 152, and 153 having the air compression surfaces 151a, 152a, and 153a generate air dampers between the disks 120a and 120b to reduce disk fluttering. That is, the air taken into the air inlet end 151b by the rotation of the disks 120a and 120b is compressed while it flows along the inclined air compression surfaces 151a, 152a, and 153a. Accordingly, pressure by the compressed air is applied to both surfaces of each of the disks 120a and 120b, and the pressure by the compressed air applied to both surfaces of each of the disks 120a and 120b reduces the disk fluttering. In other words, the compressed air between the disks 120a and 120b and the corresponding air compression surfaces 151a, 152a, and 153a produces an air damping effect to reduce the disk fluttering. Thus, a stable rotation of the disks 120a and 120b is possible so that the data recording/reproducing capability and reliability of the magnetic head are improved.

As shown in FIG. 5, the air compression surface 151a, 151b, 151c, of each of the air damper forming members 151, 152, 153, comprise a first inclined surface and may further comprise a second and a third inclined surface. That is, the first inclined surface forms a first inclined surface angle 151x with the major surface of the disk, a second inclined surface forms a second inclined surface angle 151z with the major surface of the disk, and a middle inclined surface forms a third inclined surface angle 151y, which is greater than the first or second inclined surface angle, with the major surface of the disk.

The air compression surfaces 151a, 152a, and 153a may be formed on each one of the air damper forming members 151, 152, and 153. However, it is possible to form a plurality of the air compression surfaces in series because the air damper can be formed in a larger area of the disks 120a and 120b. The sizes of the gaps $G_1$ and $G_2$ can be set appropriately by considering the rotation speed of the disks 120a and 120b and a distance between the two disks 120a and 120b so that a sufficient air damping effect can be obtained. Also, sizes of the gaps $G_1$ and $G_2$ can be set out of the above ranges. In particular, the gap $G_2$ at the air outlet end 151c is an important factor in the air damping effect. When the gap $G_2$ is too wide, a sufficient air damping effect cannot be obtained. In contrast, when the gap $G_2$ is too narrow, the disks 120a and 120b may contact the air damper forming members 151, 152, and 153 by fluttering of the disks 120a and 120b so that the surfaces of the disks 120a and 120b can be damaged.

Figure 7:
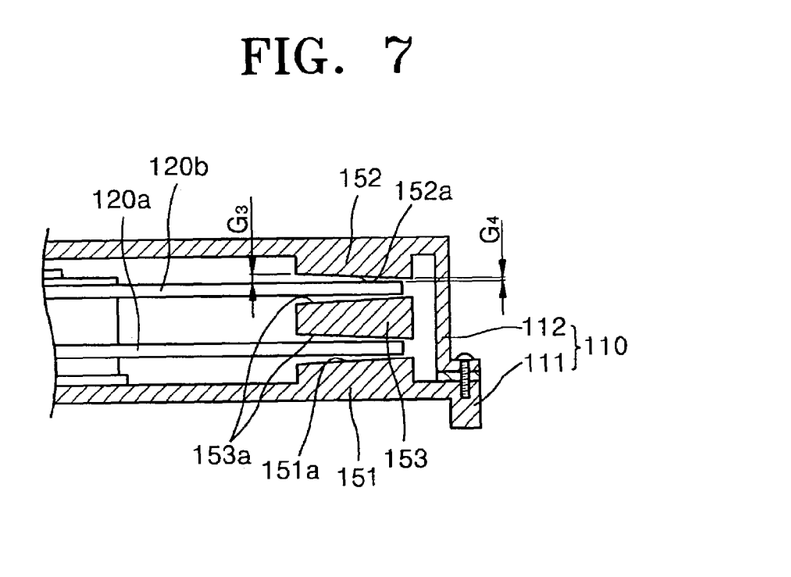
FIG. 7 is a cross-sectional view showing an air damper forming members in a radial direction of the disk fluttering reducing unit shown in FIG. 4.

FIG. 7 is a cross-sectional view showing the air damper forming members in a radial direction of the hard disk drive shown in FIG. 4.

Referring to FIG. 7, each of the air damper forming members 151, 152, and 153 is inclined such that the gap between the disks 120a and 120b and the air damper forming members 151, 152, and 153 decreases in a direction from an inner circumferential side to an outer circumferential side. That is, the air damper forming members 151, 152, and 153 are inclined in the radial direction of the disks 120a and 120b so that a fourth gap $G_4$ at an edge portion of the disks 120a and 120b is narrower than a third gap $G_3$ at an inner portion of the disks 120a and 120b. Thus, even when fluttering is generated during the rotation of the disks 120a and 120b, the edge portion or the disks 120a and 120b where no data is recorded, contacts the corresponding air compression surfaces 151a, 152a, and 153a, so that the data recording surfaces of the disks 120a and 120b are prevented from contacting the air compression surfaces 151a, 152a, and 153a.

Figure 8:
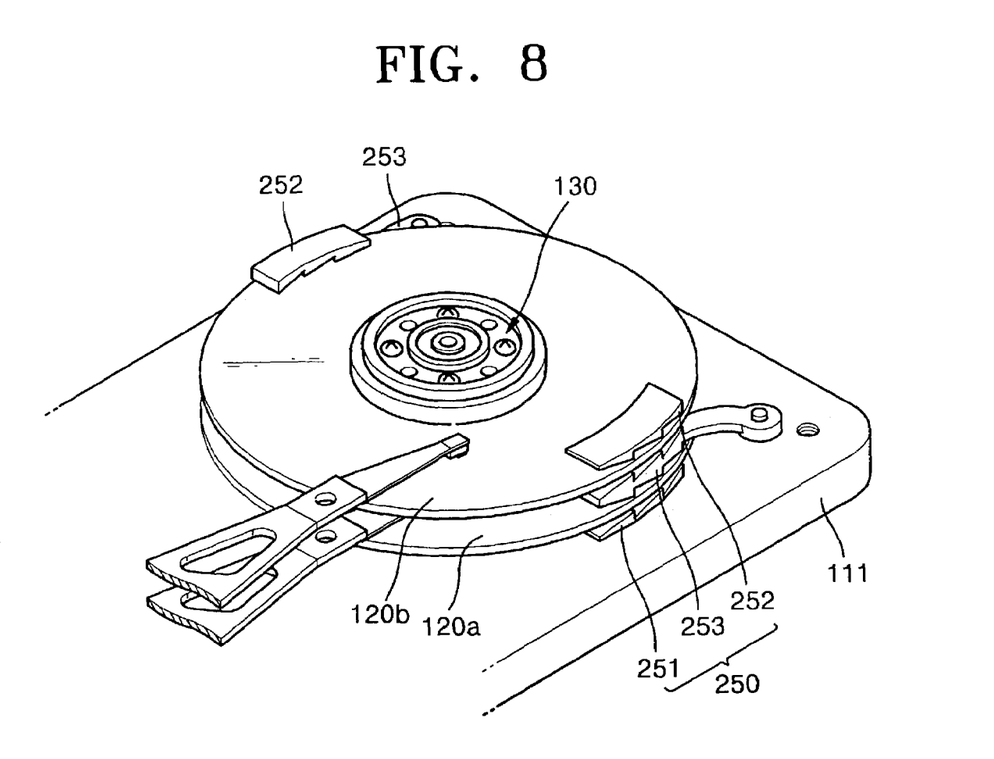
FIG. 8 is a perspective view showing a portion of a hard disk drive having a disk fluttering reducing unit according to another embodiment of the present invention.
Figure 9:
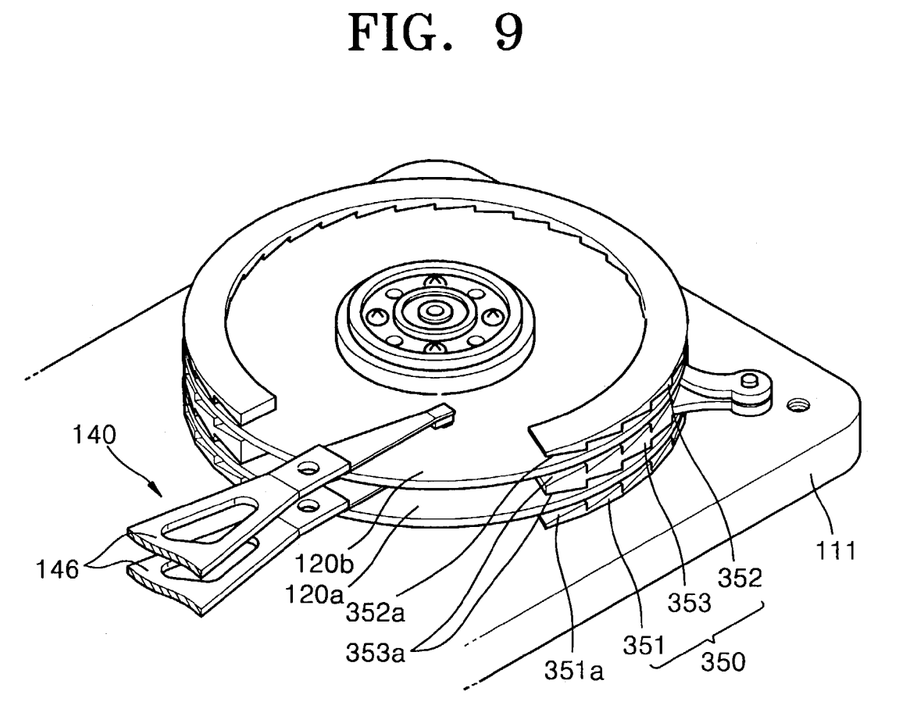
FIG. 9 is a perspective view showing a portion of a hard disk drive having a disk fluttering reducing unit according to another embodiment of the present invention.

FIGS. 8 and 9 show hard disk drives having disk fluttering reducing units according to an embodiment of the present invention. Here, the same reference numerals used in describing the embodiment shown in FIG. 4 indicate the same elements.

Referring to FIG. 8, first, in the hard disk drive, a set of air damper forming members 251, 252, and 253 of a disk fluttering reducing unit 250 is provided at two positions corresponding to each other with respect to the spindle motor 130. That is, the air damper forming members 251, 252, and 253 are provided not only in front of the actuator 140, but also at a position separated by 180° therefrom in a circumferential direction of the disks 120a and 120b. A structure, an installation method, and an operation of each of the air damper forming members 251, 252, and 253 are the same as those of the above-described embodiment shown in FIGS. 4 through 7. When respective pair of air damper forming members 251, 252, and 253 of the disk fluttering reducing unit 250 are provided at corresponding ones of two positions opposite to each other with respect to the spindle motor 130, since the forces applied by the air damper forming members 251, 252, and 253 to the disks 120a and 120b are balanced, the disks 120a and 120b can rotate stably.

Next, referring to FIG. 9, in the hard disk drive according to this embodiment of the present invention, the air damper forming members 351, 352, and 353 of a disk fluttering reducing unit 350 are installed to face an overall surface at the outer circumference of the disks 120a and 120b except for a range of an operation of the actuator 140. That is, each of the air damper forming members 351, 352, and 353 has a "C" shape in which a portion is open not to interfere with the arm 146. A structure, an installation method, and an operation of each of the air damper forming members 351, 352, and 353 are the same as those of the above-described embodiment shown in FIGS. 4 through 8. In detail, a plurality of air compression surfaces 351a, 352a, and 353a are sequentially formed at the surfaces of the air damper forming members 351, 352, and 353 facing the corresponding disks 120a and 120b along the circumferential direction of the disks 120a and 120b. Also, the middle air damper forming member 353 is divided into at least two parts, and each of the parts is coupled to the pivot pin 113 protruding from the base plate 111 to be capable of pivoting. According to the air damper forming members 351, 352, and 353 having the C shape with an open part, since a uniform force is substantially applied to the overall outer circumference of the disks 120a and 120b, not only fluttering of the disks 120a and 120b is further reduced, but also the disks 120a and 120b can rotate stably.

The disk fluttering effect in the hard disk drive having the above disk fluttering reducing unit is described below in comparison with the conventional hard disk drive.

Figure 10A:
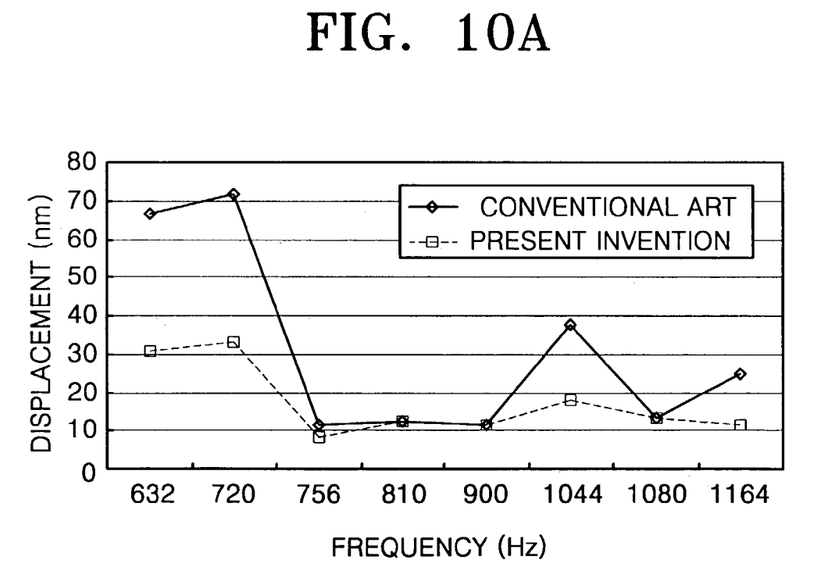
FIGS. 10A and 10C are graphs showing a displacement of fluttering of a disk, and a velocity and an acceleration of the displacement in the hard disk drive shown in FIG. 8 in comparison with the conventional hard disk drive.
Figure 10B:
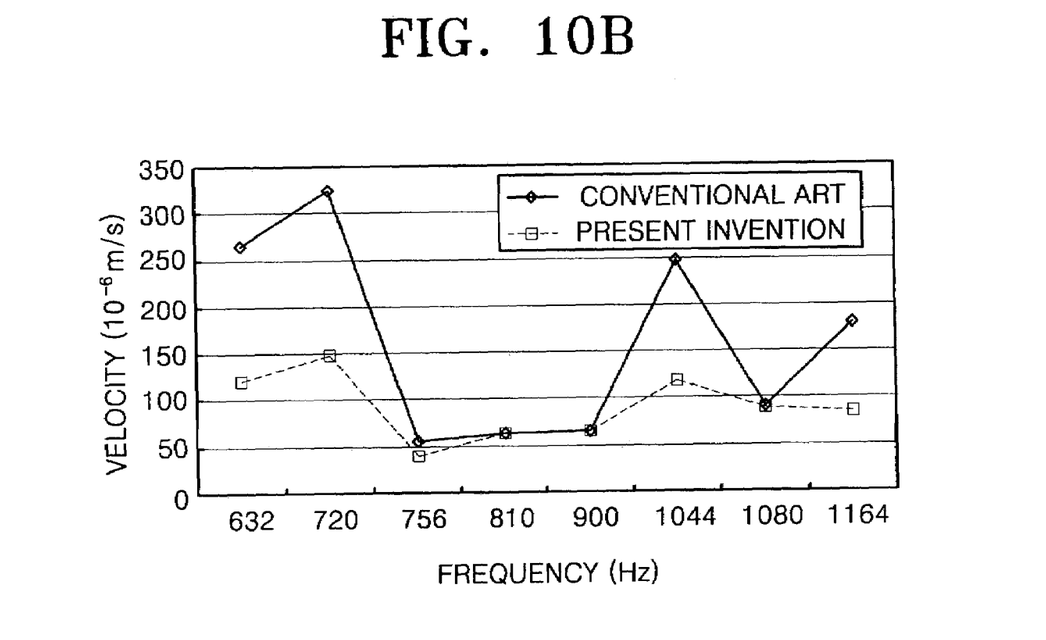
Figure 10C:
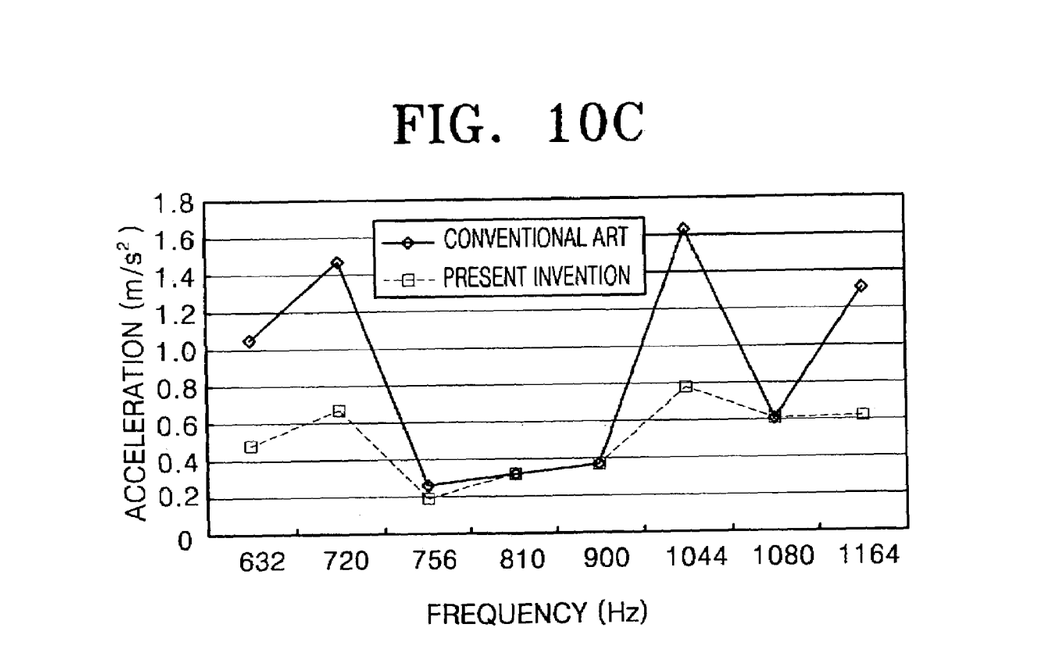

FIGS. 10A through 10C are graphs showing a displacement of fluttering, and a velocity and an acceleration of the displacement in the hard disk drive shown in FIG. 8 in comparison with a conventional hard disk drive. Here, the graphs show test results under conditions that air damper forming members having one air compression surface, a 15 mm width in a radial direction of a disk, and a 30 mm length in a circumferential direction of the disk are installed to have the maximum gap ($G_1$ of FIG. 5) of 1.2 mm and the minimum gap ($G_2$ of FIG. 5) of 0.1 mm from the disk.

First, FIG. 10A shows a maximum displacement of disk fluttering according to frequencies. Here, it can be seen that the maximum displacement of the disk fluttering in the hard disk drive having the air damper forming members according to the present invention is reduced by about 50% compared to that of the conventional hard disk drive which does not have the air damper forming members.

FIG. 10B shows the velocity of the displacement of the disk fluttering according to frequencies. FIG. 10C shows the acceleration of the displacement of the disk fluttering according to frequencies. Referring to FIGS. 10B and 10C, it can be seen that the velocity and the acceleration of the displacement in the hard disk drive having the air damper forming members according to the present invention are lower by about 50% than those of the conventional hard disk drive.

In light of the above, it can be seen that, in a hard disk drive having a disk fluttering reducing unit according to the present invention, disk fluttering is considerably reduced compared to a conventional technology. In particular, a disk fluttering reducing effect is noticeable in a relatively low frequency area (600–750 Hz) and a relatively high frequency area (950 Hz or more). Accordingly, although in the conventional hard disk drive, a deviation of values of the displacement, the velocity, and the acceleration of the disk fluttering according to frequencies are relatively great, the deviation of the values according to frequencies is remarkably reduced in the present invention.

As described above, according to the hard disk drive having the disk fluttering reducing unit according to the present invention, since the disk fluttering is reduced by the air damping operation of the disk fluttering reducing unit, the reliability in data recording/reproducing is improved. Also, a noise caused by the disk fluttering is reduced as the disk fluttering is reduced.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A hard disk drive comprising:
   a housing having a base plate and a cover plate;
   a spindle motor installed on the base plate;
   a disk installed at the spindle motor to store data;
   an actuator installed on the base plate to be capable of pivoting and having a magnetic head to record and reproduce data on and from the disk; and
   a disk fluttering reducing unit forming an air damper above a surface of the disk to reduce fluttering of the disk, wherein the disk fluttering reducing unit comprises, a lower air damper forming member provided on an upper surface of the base plate to face a bottom surface of an outer circumferential side of the disk, an upper air damper forming member provided on a bottom surface of the cover plate to face an upper surface of an outer circumferential side of the disk, and at least one air compression surface inclined in a circumferential direction of the disk so that a gap formed between the disk and the lower or upper damper forming member decreases along a rotational direction of the disk and is formed at each of surfaces of the air damper forming members facing the disk, wherein the air compression surface is inclined in a radial direction of the disk so that the gap decreases in a direction from an inner circumferential side of the disk to an outer circumferential side of the disk.

2. The hard disk drive as claimed in claim 1, wherein the lower air damper forming member is integrally formed with the base plate, and the upper air damper forming member is integrally formed with the cover plate.

3. The hard disk drive as claimed in claim 1, wherein the at least two air compression surfaces are sequentially formed along the circumferential direction of the disk.

4. The hard disk drive as claimed in claim 1, wherein the disk fluttering reducing unit is disposed close to and in front of the actuator.

5. The hard disk drive as claimed in claim 1, wherein the disk fluttering reducing unit comprises:

first and second disk fluttering reducing units disposed at corresponding ones of two positions opposite to each other with respect to the spindle motor.

6. The hard disk drive as claimed in claim 1, wherein each of the lower and upper air damper forming members of the disk fluttering reducing unit has a C shape in which a portion is open not to interfere with the actuator, to face an overall surface at an outer circumferential side of the disk except for a range of an operation of the actuator.

7. The hard disk drive as claimed in claim 6, wherein each of the air damper forming members comprises:

a plurality of air compression surfaces sequentially formed from one end portion of each of the air damper forming members to the other end portion thereof along the circumferential direction of the disk.

8. A hard disk drive comprising:
a housing having a base plate and a cover plate;
a spindle motor installed on the base plate;
at least two disks installed at the spindle motor to store data;
an actuator installed on the base plate, pivotable, and having a magnetic head to record and reproduce data on and from the disks; and
a disk fluttering reducing unit forming an air damper above the surfaces of the disks to reduce fluttering of the disks, wherein the disk fluttering reducing unit comprises,
a lower air damper forming member provided on an upper surface of the base plate to face a bottom surface of an outer circumferential side of a lowermost disk,
an upper air damper forming member provided on a bottom surface of the cover plate to face an upper surface of an outer circumferential side of an uppermost disk,
a middle air damper forming member interposed between the disks, and at least one air compression surface inclined in a circumferential direction of the disk so that a gap formed between the disks and the corresponding ones of the lower, upper, and middle air damper forming members decreases along a rotational direction of the disk and is formed at each of surfaces of the air damper forming members facing the disk, wherein each of the air damper forming members of the disk fluttering reducing unit has a C shape in which a portion is open not to interfere with the actuator, to face an overall surface at an outer circumferential side of the disk except for a range of an operation of the actuator, and wherein the middle air damper forming member is divided into two parts each installed on the base plate to be disposed between the disks.

9. The hard disk drive as claimed in claim 8, wherein the lower and upper air damper forming members are integrally formed with the base plate and the cover plate, respectively, and the middle air damper forming member is installed on the base plate to be disposed between the disks.

10. The hard disk drive as claimed in claim 8, wherein the air compression surface is inclined in a radial direction of the disk so that the gap decreases in a direction from an inner circumferential side of the disks to an outer circumferential side of the disks.

11. The hard disk drive as claimed in claim 8, wherein each of the lower, upper, and middle air damper forming members comprises:

at least two air compression surfaces sequentially formed along the circumferential direction of the disks.

12. The hard disk drive as claimed in claim 8, wherein the disk fluttering reducing unit is disposed close to and in front of the actuator.

13. The hard disk drive as claimed in claim 8, wherein the disk fluttering reducing unit comprises:

first and second disk fluttering reducing units disposed at corresponding ones of two positions opposite to each other with respect to the spindle motor.

14. The hard disk drive as claimed in claim 8, wherein each of the air damper forming members comprises:

a plurality of air compression surfaces sequentially formed from one end portion of each of the air damper forming members to the other end portion thereof along the circumferential direction of the disk.

15. A hard disk drive comprising:
a housing having a base plate and a cover plate;
a spindle motor installed on the base plate;
at least two disks installed at the spindle motor to store data;
an actuator installed on the base plate, pivotable, and having a magnetic head to record and reproduce data on and from the disks; and
a disk fluttering reducing unit forming an air damper above the surfaces of the disks to reduce fluttering of the disks, wherein the disk fluttering reducing unit comprises,
a lower air damper forming member provided on an upper surface of the base plate to face a bottom surface of an outer circumferential side of a lowermost disk,
an upper air damper forming member provided on a bottom surface of the cover plate to face an upper surface of an outer circumferential side of an uppermost disk,
a middle air damper forming member interposed between the disks, and at least one air compression surface inclined in a circumferential direction of the disk so that a gap formed between the disks and the corresponding ones of the lower, upper, and middle air damper forming members decreases along a rotational direction of the disk and is formed at each of surfaces of the air damper forming members facing the disk, wherein each of the air damper forming members of the disk fluttering reducing unit has a C shape in which a portion is open not to interfere with the actuator, to face an overall surface at an outer circumferential side of the disk except for a range of an operation of the actuator, and wherein the middle air damper forming member is divided into two parts each installed on the base plate to be disposed between the disks.

16. A hard disk drive comprising:

a housing having a disk rotatably disposed in an inside of the housing and having a major surface, and having an actuator rotatably disposed in the inside of the housing and having a head disposed above the major surface of the disk to record and reproduce data on and from the disk; and a disk fluttering reducing unit disposed in the inside of the housing, having an air damper forming member disposed to face the major surface of the disk, and having an air compression surface formed on the air damper forming member and extending outward towards the major surface of the disk and inclined with respect to the major surface of the disk to form an air damper with the major surface of the disk to reduce fluttering of the disk, wherein the air compression surface of the air damper forming member is inclined in a radial direction of the disk and wherein the inclined surface of the air damper forming member comprises:

an air inlet end forming a first gap with the major surface of the disk; and an air outlet end forming a second gap with the major surface of the disk.

17. The hard disk drive as claimed in claim 16, wherein the air compression surface of the air damper forming member is inclined in a circular direction of the disk.

18. The hard disk drive as claimed in claim 16, wherein the major surface of the disk comprises an inside portion and an outside portion, and the air damper forming member is disposed on a position corresponding to the outside portion of the major surface of the disk.

19. The hard disk drive as claimed in claim 16, wherein the major surface of the disk comprises a first area in which the actuator rotates, and a second area in which the actuator does not reach, and the air damper forming member is disposed on a position corresponding to the second area of the major surface of the disk.

20. The hard disk drive as claimed in claim 16, wherein the housing comprises a base plate and a cover plate coupled to cover the base plate, and the air damper forming member is disposed on one of the base plate and the cover plate.

21. The hard disk drive as claimed in claim 16, wherein the first gap is greater than the second gap.

22. The hard disk drive as claimed in claim 16, wherein the first gap and the second gap vary according to a radial direction of the disk and a rotational direction of the disk.

23. The hard disk drive as claimed in claim 16, wherein the air damper forming member has a radial length in a radial direction of the disk and a circular length in a circular direction of the disk, and the circular length is longer than the radial length.

24. The hard disk drive as claimed in claim 16, wherein the air damper forming member is disposed along a circular direction of the disk.

25. The hard disk drive as claimed in claim 14, where the inclined surface of the air damper forming member forms with the disk a gap between 1.2 mm and 0.1 mm inclusive.

26. The hard disk drive as claimed in claim 16, where the disk fluttering reducing unit is formed in a circular direction of the disk with an angle greater than 180 degrees with a center of the disk.

27. A hard disk drive comprising:

a housing having a disk rotatably disposed in an inside of the housing and having a major surface, and having an actuator rotatably disposed in the inside of the housing and having a head disposed above the major surface of the disk to record and reproduce data on and from the disk: and a disk fluttering reducing unit disposed in the inside of the housing, having an air damper forming member disposed to face the major surface of the disk, and having an air compression surface formed on the air damper forming member and extending outward towards the major surface of the disk and inclined with respect to the major surface of the disk to form an air damper with the major surface of the disk to reduce fluttering of the disk, wherein the air compression surface of the air damper forming member is inclined in a radial direction of the disk, wherein the air compression surface of the air damper forming member comprises:

a first inclined surface and a second inclined surface which are arranged in a rotational direction of the disk, wherein the air damper forming member comprises:

a middle surface formed between the first inclined surface and the second inclined surface, and wherein the first inclined surface forms a first angle with the major surface of the disk, the second inclined surface forms a second angle with the major surface of the disk, and the middle inclined surface forms a third angle, which is greater than the first or second angle, with the major surface of the disk.

28. The hard disk drive as claimed in claim 27, wherein the first angle and the second angle are the same.

29. The hard disk drive as claimed in claim 27, wherein the middle surface of the air damper forming member is perpendicular to the major surface of the disk.

30. A hard disk drive comprising:

a housing having a disk rotatably disposed in an inside of the housing and having a major surface, and having an actuator rotatably disposed in the inside of the housing and having a head disposed above the major surface of the disk to record and reproduce data on and from the disk; and a disk fluttering reducing unit disposed in the inside of the housing, having an air damper forming member disposed to face the major surface of the disk, and having an air compression surface formed on the air damper forming member and extending outward towards the major surface of the disk and inclined with respect to the major surface of the disk to form an air damper with the major surface of the disk to reduce fluttering of the disk, wherein the air compression surface of the air damper forming member is inclined in a radial direction of the disk, and wherein: the disk comprises,
- a first disk and a second disk which are spaced-apart from each other and each have the major surface;

the air damper forming member comprises,
- a first air damper forming member having a first inclined surface facing the major surface of the first disk;
- a second air damper forming member having a second inclined surface facing the major surface of the second disk, and
- a middle air damper forming member disposed between the first disk and the second disk; and the housing comprises,
- a base plate and a cover plate, the first air damper forming member is disposed on the base plate, and the second air damper forming member is disposed on the cover plate.

31. The hard disk drive as claimed in claim 30, wherein the middle air damper forming member comprises:
a middle inclined surface facing one of the major surfaces of the first disk and the second disk.

32. The hard disk drive as claimed in claim 31 wherein the middle air damper forming member comprises:
a first middle inclined surface and a second middle inclined surface which face corresponding ones of the major surfaces of the first disk and the second disk.

33. The hard disk drive as claimed in claim 32 wherein the middle air damper forming member comprises:
- a hinge coupled to one of the base plate and the cover plate; and
- a distal end extended from the hinge to be disposed between the first disk and the second disk.

34. A hard disk drive comprising:
- a housing having a disk rotatably disposed in an inside of the housing and having a major surface, and having an actuator rotatably disposed in the inside of the housing and having a head disposed above the major surface of the disk to record and reproduce data on and from the disk; and
- a disk fluttering reducing unit disposed in the inside of the housing, having an air damper forming member disposed to face the major surface of the disk, and having an air compression surface formed on the air damper forming member and extending outward towards the major surface of the disk and inclined with respect to the major surface of the disk to form an air damper with the major surface of the disk to reduce fluttering of the disk,
wherein the air compression surface of the air damper forming member is inclined in a radial direction of the disk and the disk fluttering reducing unit has a C shape in which a portion is open not to interfere with the actuator.

35. A method in a hard disk drive having a housing formed with a base plate and a cover plate, the method comprising:
- forming a first air damper forming member on an upper surface of the base plate to face a bottom surface of a first disk;
- forming a second air damper forming member on a bottom surface of the cover plate to face an upper surface of a second disk;
- forming a pivot pin on the base plate;
- coupling a first end portion of a middle air damper forming member to the pivot pin so that a second end portion of the middle air damper forming member is disposed outside of the first disk;
- mounting a first disk on an axle connected to a motor;
- moving the second end of the middle air damper forming member above the first disk;
- mounting a second disk on the axle connected to the motor so that the second end of the middle air damper forming member is disposed between the first disk and the second disk; and
- coupling the cover plate to the base plate,
wherein each of the air damper forming members has a C shape in which a portion is open not to interfere with an actuator, to face an overall surface at an outer circumferential side of the disk except for a range of an operation of the actuator, and
wherein the middle air damper forming member is divided into two parts each installed on the base plate to be disposed between the disks.

36. A hard disk drive comprising:
- a housing having a base plate and a cover plate;
- a spindle motor installed on the base plate;
- a disk installed at the spindle motor to store data;
- an actuator installed on the base plate to be capable of pivoting and having a magnetic head to record and reproduce data on and from the disk; and
- a disk fluttering reducing unit forming an air damper above a surface of the disk to reduce fluttering of the disk, wherein the disk fluttering reducing unit comprises,
- a lower air damper forming member extended from an upper surface of the base plate to face a bottom surface of an outer circumferential side of the disk,
- an upper air damper forming member extended from a bottom surface of the cover plate to face an upper surface of an outer circumferential side of the disk, and
- at least one air compression surface inclined in a circumferential direction of the disk so that a gap formed between the disk and the lower or upper damper forming member decreases along a rotational direction of the disk and is formed at each of surfaces of the air damper forming members facing the disk,
wherein the air compression surface of the air damper forming member is inclined in a radial direction of the disk.

37. A disk fluttering reducing unit for a hard disk drive including a lower disk and an upper disk, comprising:
- a lower air damper forming member provided to face a bottom surface of an outer circumferential side of the lower disk,
- an upper air damper forming member provided to face an upper surface of an outer circumferential side of the upper disk,
- a middle air damper forming member interposed between the disks, and
- at least one air compression surface inclined in a circumferential direction of the disk so that a gap formed between the disks and the corresponding ones of the lower, upper, and middle air damper forming members decreases along a rotational direction of the disk and is formed at each of surfaces of the air damper forming members facing the disk,
wherein each of the air damper forming members of the disk fluttering reducing unit has a C shape in which a portion is open.

* * * * *

UNITED STATES PATENT AND TRADEMARK OFFICE
CERTIFICATE OF CORRECTION

PATENT NO.        : 7,106,553 B2
APPLICATION NO. : 10/394067
DATED             : September 12, 2006
INVENTOR(S)       : Do-wan Kim It is certified that error appears in the above-identified patent and that said Letters Patent is hereby corrected as shown below:

Title Page, Column 1 (Title), Line 4, after "OF A" change "ROTATION DISK" to --ROTATING DISK--.

Column 11, Line 35, after "disk" insert --,--.

Column 12, Line 7, change "claim 14," to --claim 16,--.

Column 12, Line 20, change "disk:" to --disk;--.

Column 13, Line 25, change "claim 31" to --claim 30,--.

Column 13, Line 30, after "claim 32" insert --,--.

Signed and Sealed this

Third Day of July, 2007

JON W. DUDAS
*Director of the United States Patent and Trademark Office*